Dec. 6, 1966  L. R. LEIDY, JR  3,290,691
RECORDER WITH FLEXIBLE TAPE INDICATOR
Filed Nov. 27, 1964  2 Sheets-Sheet 1
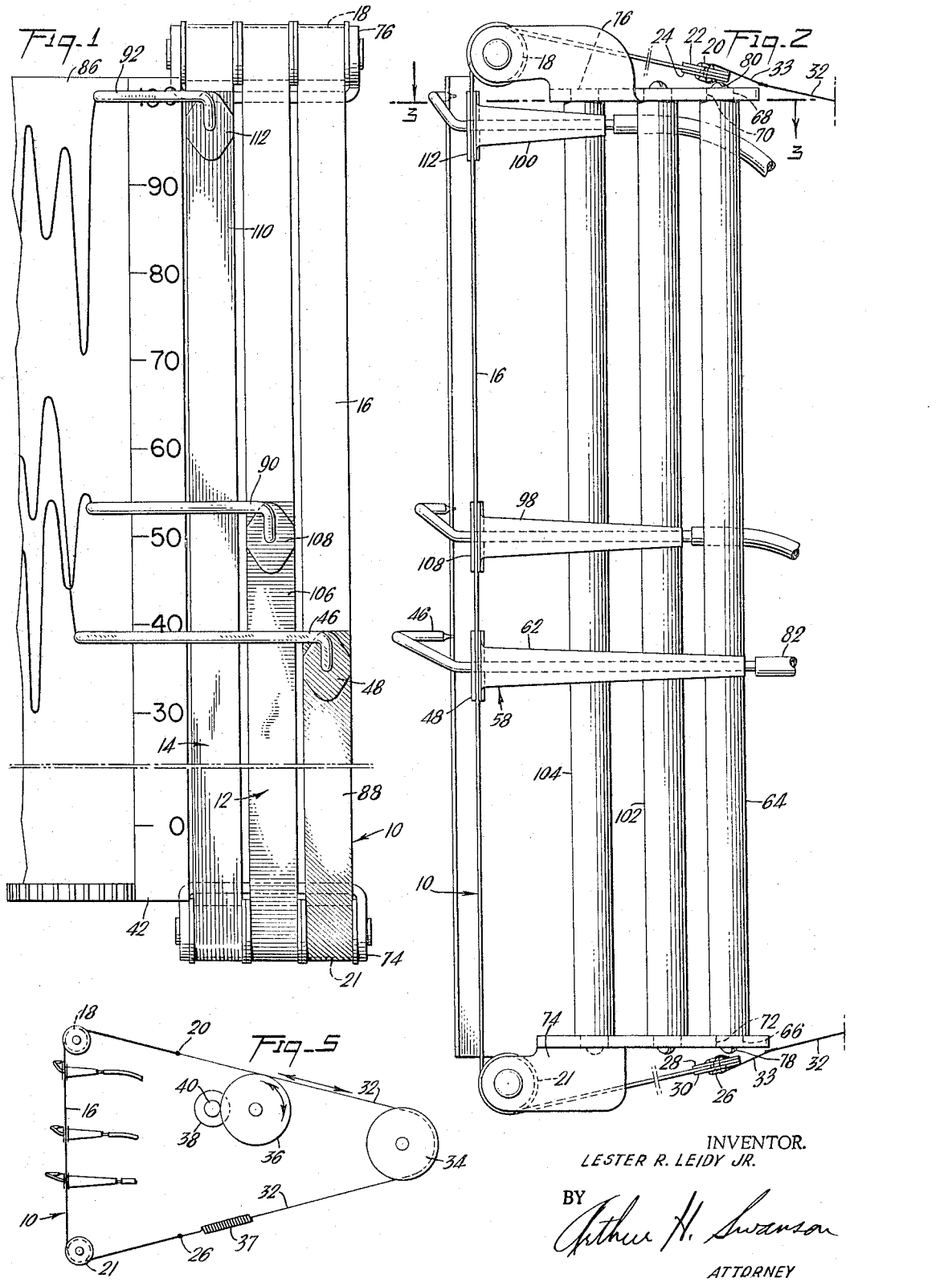
INVENTOR.
LESTER R. LEIDY JR.
BY Arthur H. Swanson
ATTORNEY Dec. 6, 1966  L. R. LEIDY, JR  3,290,691
RECORDER WITH FLEXIBLE TAPE INDICATOR
Filed Nov. 27, 1964  2 Sheets-Sheet 2
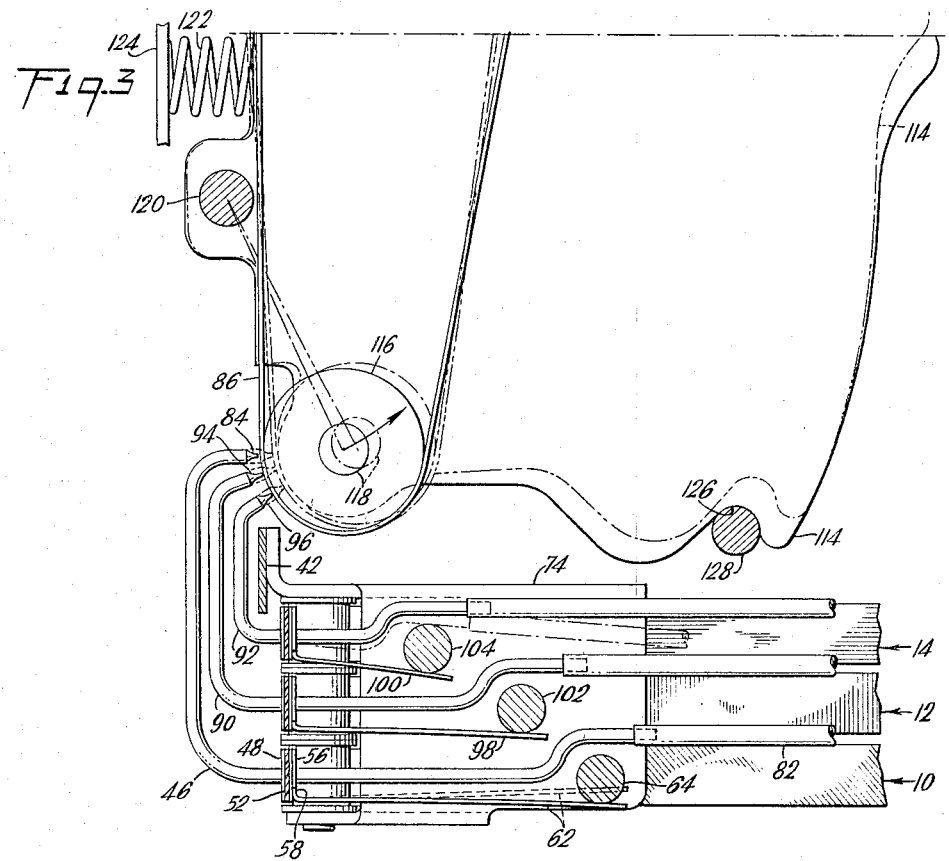
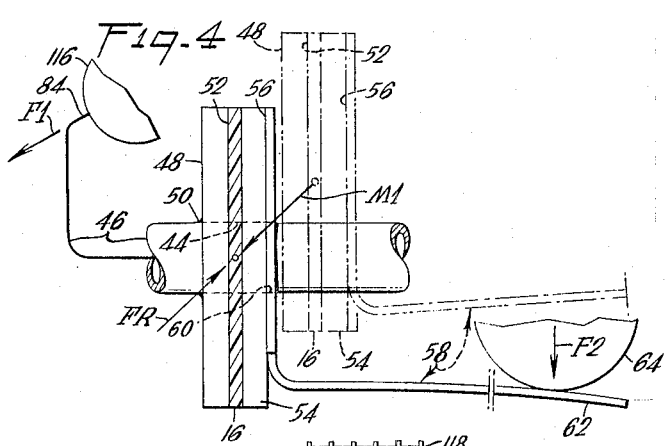
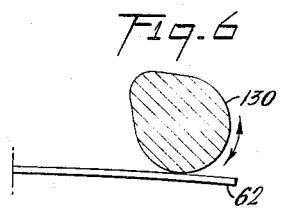
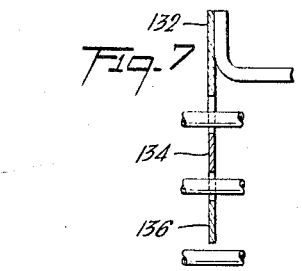
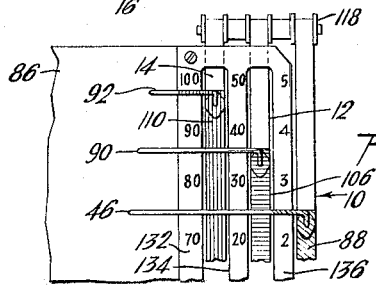
INVENTOR.
LESTER R. LEIDY JR.
BY *Arthur H. Swanson*
ATTORNEY United States Patent Office 3,290,691
Patented Dec. 6, 1966

3,290,691
RECORDER WITH FLEXIBLE TAPE INDICATOR
Lester R. Leidy, Jr., Oreland, Pa., assignor to Honeywell Inc., Minneapolis, Minn., a corporation of Delaware
Filed Nov. 27, 1964, Ser. No. 414,265
14 Claims. (Cl. 346—17)

It is one of the major objects of the present invention to disclose an apparatus for retaining a marking element in proper marking contact with a chart so that a desired pressure is continuously applied by the marking element against the chart.

More specifically, it is another object of the present invention to provide a pen-retaining apparatus of the aforementioned type in which the non-marking end of the pen is attached to a spring-biased longitudinal portion of a tensioned flexible tape.

It is another object of the invention to disclose the use of a tensioned, flexible web that employs either a flexible metal or plastic tape made of, for example, a material tradenamed Mylar as a means by which the non-inking end of the pen can force its inking end into proper pressure engagement with a chart.

It is another object of the present invention to employ a means for applying a selective amount of tension to the aforementioned flexible tape for altering the stiffness and the longitudinal, pivotal, twisting action of the tape so that a force which a spring-biased means applies through a pen-connected portion of the tape to the pen can be altered in order to obtain a desired pressure between the pen and the strip chart over which the pen is brought into physical contact.

It is another object of the present invention to provide the aforementioned strip chart recording apparatus with a plurality of the aforementioned type of tape-carrying pen-marking means in which each pen-marking means contains a different color pen arm to act as an indicator as it is moved in spaced relation with respect to the other pen arms along a common indicating scale.

It is a further object of the present invention to provide the aforementioned pen-retaining apparatus with an adjustable means for applying one of a plurality of different selected amounts of tension along the longitudinal axis of the tape and a means for applying one of a plurality of different selected amounts of spring-biased forces in a horizontal plane to the portion of the tape to which the spring is attached so that a desired pressure between the pen and the chart with which it is in contact can readily be obtained.

Another object of the present invention is to employ a spring-biased roller to move a portion of a chart that is wrapped thereon into a desired compressed engagement with the recording ends of the aforementioned pens, thereby eliminating the need of pen lifters and providing a unique way of recording a plurality of clearly visible ink lines on a chart.

It is another object of the present invention to disclose a recorder of the aforementioned type in which a portion of the length of each of the flexible web members forms an opaque column, and an opaque pen protrudes from the top surface of each column to thereby form a readily-readable leg of an angularly-shaped indicator of varying column length as the pen traverses the strip chart.

It is also another object to provide a modified form of the aforementioned apparatus in which the color of the column and the pen is of a different contrasting color than that of the scale so that an immediate reading of the scale can be readily determined by one located at a distance from the scale.

It is another object of the invention to disclose a modified form of the aforementioned apparatus in which a separate indicating scale is provided along a side edge of each of the aforementioned tapes and a distinctively different colored non-inking end of each of the pens associated with these tapes is employed as an indicator for each scale.

A better understanding of the present invention may be had when the following detailed description is read in connection with the accompanying drawings in which:

FIG. 1 is a front elevation of the indicating recorder;
FIG. 2 is a side elevation of the indicating recorder;
FIG. 3 is a view showing the pen arm spring plate in both its dotted-line inoperative position and in its solid-line operative position;
FIG. 4 shows how the center of the flexible pivot point, formed by the tensioned tape between the spring arm and the pen, is shifted when the spring plate is moved from its dotted-line to its solid-line position shown in FIG. 3;
FIG. 5 is a view to schematically show how a separate balancing motor is employed to move each of the pens attached to the flexible webs that are shown in detail in FIGS. 1–4 from one end to the other end of a chart;
FIG. 6 shows how a cam can be employed in lieu of the rod to adjust the spring bias force that is being applied by the spring plate of FIG. 4 at the non-inking support end of the pen;
FIG. 7 is a modified form showing how a separate indicating scale can be employed for each recording indicating pen in lieu of the common three-pen indicating scale shown in FIG. 1; and
FIG. 8 shows how a multi-indicating scale, such as that shown in FIG. 7, can be substituted for the single indicating scale shown in FIG. 1.

FIGURES 1 to 4 show three of the aforementioned flexible pen-retaining units 10, 12, 14. The unit 10, shown in FIG. 5, is comprised of a tape 16 made of a flexible web material such as a plastic material tradenamed Mylar. One of the end portions of the flexible tape 16 is shown in FIGS. 2 and 5 passing over a pulley 18 and has mounted thereon by means of an eyelet 20 two plates 22, 24.

The other end portion of the flexible tape 16 is shown passing over a pulley 21 and terminating with an end portion that also has an eyelet 26 for attaching two plates 28, 30 to the tape 16.

As is best seen in FIG. 2, one end of the wire 32 is shown passing through the hollow central portion of the rivet 25, and its other end is shown passing through the eyelet 20.

Each of the free ends of the wire 32 is also shown retained in place by hooking it by means of a hook 33 to the eyelets 20, 26. A portion between the ends of the wire 32 is shown in FIG. 5 passing over a pulley 34 and wrapped about a gear-driven, grooved drum 36. A low gradient spring 37 is also shown to maintain a substantially constant tension along the longitudinal axis of the tape.

The grooved drum 36 is, in turn, schematically shown being drive in either a clockwise or counter-clockwise direction by means of a balancing motor 38 and the motor pinion 40. When the magnitude of a variable being measured (not shown) is increased, it can be seen that the balancing motor pinion 40 will be rotated by the balancing motor 38 in a direction to rotate the gear-driven grooved drum 36 and to move the wire 32 and the tape 16 attached thereto in an upward direction along the indicating scale 42.

When the magnitude of the variable being measured is decreased, it can be seen that a reverse action of the balancing motor 38 will occur and the tape 16 will be moved in a downward direction along the scale 42.

As is best shown in FIG. 4, the flexible tape 16 has an apertured wall portion 44 in a central portion thereof to accommodate the passage of an end portion of a capillary tube that forms a marking member 46. A suitable washer 48 is shown connected by a welding material 50 to the capillary tube 46. The washer 48 is retained in fixed relationship with the flexible tape 16 by cementing its entire right side surface 52 to the flexible tape 16.

Another washer 54 that is identical in shape to the washer 48 is shown fixedly connected by a suitable means, such as spot welding, along its right side surface 56 to the left side surface of a substantially L-shaped force-applying spring member 58 that has an apertured wall 60 therein.

The washer 54 is retained in fixed relation with the flexible tape 16 by cementing its entire left side surface to the tape 16, as is best shown in FIG. 4.

The other end of the force-applying L-shaped spring member 58 is shown having a lower spring portion 62 sprung into engagement with the cylindrical surface of the tie rod 64 so that it is in a position to continuously apply a constant force to the flexible tape 16. The phantom-line position of the L-shaped spring member 58 and the other associated parts that are shown in phantom are to better illustrate the non-force-applying condition that the spring 58 and its associated parts would otherwise be in if the rod 64 were not present to enable the end 62 of the L-shaped spring to apply a spring force to the flexible tape 16 and thereby cause the tape to act as a pivot about which the marking member 46 can be moved.

FIG. 2 shows the opposite ends 66, 68 of the rod 64 purposely made of a smaller diameter than the central portion in order to accommodate the mounting of the apertured wall portion 70, 72 of the pulley support members 74, 76 thereon.

Suitable screws 78, 80 are shown in FIG. 2 employed to retain the pulley support member 74, 76 in fixed surface-to-surface engagement with their associated ends of the tie rod 64.

Although not shown, the flat portion of the pulley support members 74, 76 is extended from the position shown toward the rear of the instrument to form a chassis which is slidably mounted in a casing, not shown.

The rear or non-marking portion of the capillary tube that forms a marking member 46 in shown in FIG. 3 as having a flexible capillary tube extension 82 thereon. Although not shown in the drawing, the right end of the tube 82 is connected in a conventional manner with a suitable ink reservoir. Ink will, therefore, flow by the conventional capillary action through the flexible tube 82, through the pen tip 84 of the flexible tape-mounted marking capillary tube 46 onto different successive surfaces of a moving chart 86 as the magnitude of the variable being recorded is altered and the rotation of the balancing motor 38 simultaneously causes grooved drum 36 to move the flexible tape 16 along the indicating scale 42.

The lower shaded portion 88 of the flexible tape 16 shown in FIG. 1 represents that portion of the tape that is made of a first opaque color. The capillary tube in front of the tape 16 is of the same opaque color as the lower shaded portion 88 of the tape and is purposely fixed at a location on the flexible tape so it will provide a common colored indicating arm that can be simultaneously moved across the indicating scale 42 at the same level as the top of the opaque indicating portion of the tape 16.

The remaining upper non-shaded portion of the tape 16 is preferably painted white for contrast, but may be made of translucent or a transparent material. It can be seen that a pen has been combined with a tape to form a movable angular-shaped colored indicator. This angle-shaped indicator is, thus, comprised of the opaque, colored portion 88 of the tape 16, the opaque, colored washer 48 and the opaque, colored pen arm 46.

One of the few differences between the pen-retaining units 12 and 14 and the pen-retaining unit 10, which has already been described in detail, is that the length of the associated capillaries 90, 92 that extend from the pen ends 94, 96 are of shorter dimension than capillary 46.

Another difference is that the length of one of the legs of their L-shaped spring members 98, 100 which engages their associated tie rods 102, 104 is of different length than the leg 62 of spring member 58 and of a different, greater thickness than the leg 62. In this way, the same spring load can be applied by spring members 98, 100 to their associated flexible tapes 12, 14 as the spring member 58 applies to its associated tape.

Another essential difference is that the shaded lower half portion 106 of the flexible tape 12 located below the top of the washer 108 and the marking pen end of the capillary 90 protruding therefrom are all made of a second opaque color which is different from the uniform first color selected for the lower half portion 88 of the previously-mentioned tape 10 and its associated pen 46.

The shaded lower half portion 110 of the flexible tape unit 14 located below the top of the washer 112 and the marking end of the capillary 92 protruding therefrom are both made of a third opaque color which is different from the uniform first and second color selected for the two previously-mentioned tape portions 88, 106, washers 48, 108 and pen units 46, 90.

From the aforementioned description, it can be seen that three separately-moving, unitary, angle-shaped, flexible tape-pen parts which are each of a different color are disclosed which will readily assist the human eye to immediately identify the indicating scale value of the magnitude of three variables that are simultaneously being recorded on a strip chart. It should, of course, be understood that it is within the scope of the present disclosure, if it is so desired, to envision the use of a greater number of flexible pen-retaining units than the three pen-retaining units 10, 12, 14.

When a recording operation is to be effected by the aforementioned three-pen flexible tape recording-indicating apparatus, the lever 114 of the chart roller 116 and roller shaft 118 mounted thereon is rotated from its non-recording phantom-line position into its solid-line recording position about the pivot shaft 120, as shown in FIG. 3. In this solid-line recording position, a coil spring 122 having one end in contact with a stationary chassis part 124 is used in the manner shown in FIG. 3 to retain a spring force on the upper left side of the lever 114 so that the slotted portion 126 of lever 114 will remain in physical contact with the stationary pin 128.

The force of the spring 122 will also enable the roller 116 to press a portion of the chart paper 86 against the pens 84, 94, 96 to move them from their dotted-line position to their solid-line position, as is also best shown in FIG. 3.

This arrangement is unique in that it will allow the chart paper on which a record is being made to be moved away from the pens without the need of the pen lifters and also enables the operator to always move the chart paper 86 back into the same good contacting position with the tip of the pens 84, 94, 96.

The movement of the pen points 84, 94 and 96 and their associated capillaries 46, 90 and 92 in the aforementioned manner is made possible for the reasons best illustrated in FIG. 4 to be hereinafter described.

The arrow M1 shown in FIG. 4 is for the purpose of pointing out in exaggerated form the direction in which the center of the tape is simultaneously moved and rotated a minute amount in a clockwise direction when the force-applying spring member 58 is moved from its phantom-line position to its solid-line position. FIG. 4 also shows that the chart roller 116 applies a force F1 against the ends of any one of the pens, such as pen 84, while the force F2 is being simultaneously applied by way of a force-applying spring member 58 which provides a pivot for the strip 62. These forces F1 and F2 will react against the resistive tension applied along the longitudinal axis to the ends of the tape to form a reacting force FR. Arrangement of the components in the manner shown in the drawings will thus enable the pen to always be brought into a desired positive pivotal contacting position with the chart each time a recording operation takes place so that a clear record of three variables can simultaneously be recorded.

FIG. 6 shows a cam-shaped tie rod 130 that can be substituted for any one or all of the cylindrical-shaped tie rods 64, 102 and 104 whenever it is desired to increase or decrease the amount of force any one of the springs 62, 98 or 100 applies to its associated flexible tape 10, 12 or 14. This can be done by respectively manually rotating a low and high point of the cam into engagement with the spring 62, 98 or 100.

FIG. 7 shows a modified form of the invention in which separate indicating scales 132, 134, 136, which have different scale indications, thereon are employed in lieu of the single common indicating scale 42 shown in FIG. 1.

It should readily be understood that in some applications of the three-pen instrument, as shown in FIG. 8, it may be desirable to color only the shaded portion of the capillary tube that extends between its associated flexible tape and the left side of the indicating scale 136, 134 or 132 with which these pen-retaining tapes are associated instead of coloring the entire length of these capillary tubes. In this way, it can be seen that only a single identifying colored capillary will be visible over each of the indicating scales 136, 134, 132 regardless of the position of the pens 46, 90, 92 on the chart 86.

It, therefore, becomes evident that a unique angularly-shaped, clearly visible pen-flexible tape indicating and recording apparatus has been disclosed. Furthermore, since these pens can be advantageously forced to pivot about a spring-biased central portion of the flexible tape on which they are individually mounted, the end of the capillary that forms these pens can individually be displaced by manually moving a roller and a strip chart mounted thereon into contact with the tips of the pens so that a good clear line will always be inscribed on the strip chart as the contacting strip chart and pens are thereafter moved relative to one another.

What is claimed is:

1. An apparatus for indicating and recording, comprising a strip chart, a stationary support, a drive means responsive to the variable being measured, a scale mounted on said support, a flexible member movable relative to said scale and having distinguishing portions cooperating with said scale to form an indicator, means connected to the ends of the flexible member to place the flexible member under tension, a recorder comprising a marking element forming an extensible pointer portion of the indicator and in engagement with said chart and said flexible member, and a force-applying means connected to the flexible member to apply a twist thereto and to bias said marking element against said chart.

2. The apparatus for indicating and recording as defined in claim 1, wherein a portion of the length of said flexible member forms an opaque column and the marking element is positioned to protrude from the top surface of the column across said scale, said marking element and the opaque column forming an angularly-shaped indicator, and the length of the column forming one leg of the angularly-shaped indicator being operably connected to vary in length as the marking element traverses the scale.

3. The apparatus for indicating and recording as defined in claim 1, wherein a portion of the length of said flexible member forms a colored column of a different contrasting color than the scale, the marking element is positioned to extend away from the top surface of the column across said scale, said marking element being of a different contrasting color than the scale and jointly forming an angularly-shaped indicator with the colored column and the length of the column forming one leg of the angularly-shaped indicator being constructed to vary in length as the marking element traverses the scale.

4. The apparatus defined by claim 1 further comprising, a means connected to the flexible member to apply a selected amount of a twisting force thereto and thereby alter the stiffness and longitudinal, pivotal, counter, twisting action of the flexible member to any twisting force applied by way of the chart and pen to said flexible member.

5. The apparatus defined by claim 1, wherein the force-applying biasing means is comprised of a leaf spring of an angular-shaped configuration and wherein one of the ends of the spring is fixedly connected to the flexible member and the other end of the spring is in tensioned engagement with a cylindrical member mounted on the support.

6. The apparatus defined in claim 1, wherein the force-applying biasing means is comprised of a leaf spring of an angular-shaped configuration and wherein one of the ends of the spring is fixedly connected to the flexible member and the other end of the spring is in tensioned engagement with a rotatable cam-shaped member mounted on the support.

7. The apparatus for indicating and recording as defined by claim 1, wherein a spring-biased roller means is operably connected to mechanically move a portion of the chart in one direction into a desired compressed inking engagement with the recording end of the marking element when an indicating and recording operation is to be accomplished wherein the spring-biased roller means is further operably connected to mechanically move the chart in the opposite direction away from and out of its compressed recording engagement with the end of the marking element.

8. An apparatus for indicating and recording, comprising a strip chart, a stationary support comprising a hollow chassis having an opening therein and having sides of equal length, a pen carriage in the form of a flexible web member having distinguishing portions adapted to be mounted in said support, means connected to the ends of the flexible member to place the flexible member under tension, an indicator comprising a stationary scale adjacent one edge of the opening in said stationary support, the division between said distinguishing portions cooperating with the stationary scale to form an indication therewith, a recorder comprising a pen adapted to engage said chart and to make a record thereon, means for supplying ink to said pen, said pen being connected to said flexible web member, means for biasing said pen into engagement with said chart, said biasing means including a spring attached to one portion of said flexible web member, and a stationary portion of said chassis engaging another portion of said spring to apply a twist to said flexible member.

9. An apparatus for indicating and recording, comprising a strip chart, a stationary support, drive means responsive to changes in the magnitude of a variable to be measured mounted on said stationary support, an indicator comprising a scale mounted on said stationary support, a flexible member driven by said drive means and movable relative to said scale so as to provide in conjunction with said scale an indication of the magnitude of the variable being measured, a recorder comprising a marking element to make a record of the magnitude of the variable on the strip chart, and means for biasing said marking element into engagement with said strip chart including tension-applying means attached to said flexible member and a biasing means in contact with the flexible member and bearing against a stationary portion of said chassis.

10. An apparatus for indicating and recording the magnitude of a plurality of variables, comprising a strip chart, a stationary support, separate drive means mounted on said stationary support, each drive means being responsive to changes occurring in the magnitude of a different one of the variables, an indicator comprising a scale mounted on said stationary support, separate flexible members each driven by a different one of the drive means and movable relative to said scale so as to provide in conjunction with said scale a simultaneous indication of each of the variables being measured, a recorder comprising separate marking elements to make a record on the strip chart of the magnitude of each variable, and means for biasing said marking elements into marking engagement with said strip chart including separate tension-applying means attached to each of said flexible members and a biasing means in contact with each of the flexible members and bearing against a stationary portion of said chassis.

11. The apparatus for indicating and recording as defined in claim 10, wherein a spring-biased roller means is operably connected to mechanically move a portion of the chart in one direction into a desired compressed inking engagement with the recording ends of the marking elements when an indicating and recording operation is to be accomplished and wherein the spring-biased roller means is further operably connected to mechanically move the chart in the opposite direction away from and out of its compressed ink recording engagement with the record recording ends of the marking elements.

12. The apparatus defined by claim 10, wherein a portion of the length of each flexible member forms an opaque column, each of the marking elements is connected to a flexible member and protrudes from the top surface of its associated column across the scale, each of the marking elements and their associated columns being positioned to form separate angularly-shaped indicators, and the length of each column that forms one leg of its angularly-shaped indicator being operably connected to vary in length as its marking element traverses the scale.

13. The apparatus defined by claim 10, wherein a portion of the length of each flexible member forms a colored column of different contrasting color than the scale, each of the marking elements is conncted to a flexible member and protrudes from the top surface of its associated column across the scale, each of the marking elements and its associated column being positioned to form separate angularly-shaped indicators, and the length of each column that forms one leg of its angularly-shaped indicator being operably connected to vary in length as its marking element traverses the scale.

14. An apparatus for indicating and recording the magnitude of a plurality of variables, comprising a strip chart, a stationary support, a plurality of drive means each mounted on said stationary support and responsive to changes occurring in the magnitude of a different one of the variables being measured, a plurality of indicators each comprising a scale mounted on said stationary support, separate flexible members each driven by a different one of the drive means and movable relative to a separate one of said scales so as to provide in conjunction with its associated scale a simultaneous indication of each of the variables being measured, a recorder comprising separate marking elements to make a record on the strip chart of the magnitude of each variable, and means for biasing said marking elements into marking engagement with said strip chart including a separate tension-applying means attached to each of said flexible members and a biasing means in contact with each of the flexible members and bearing against a stationary portion of said chassis.

References Cited by the Examiner
UNITED STATES PATENTS

| | | | |
|---|---|---|---|
| 1,772,605 | 8/1930 | Holland | 346—49 X |
| 2,488,338 | 11/1949 | Senegas | 116—135 |
| 2,673,138 | 3/1954 | Bartley et al. | 346—140 |
| 3,158,026 | 11/1964 | McGhee | 346—32 X |

RICHARD B. WILKINSON, *Primary Examiner.*

J. W. HARTARY, *Assistant Examiner.*